Dec. 22, 1964 G. J. KLUSMIRE 3,161,999
PACKAGING
Filed Feb. 12, 1962

INVENTOR.
Galen J. Klusmire
BY
AGENT

3,161,999
PACKAGING

Galen J. Klusmire, Westlake, Ohio, assignor to The Dow Chemical Company, Midland, Mich., a corporation of Delaware
Filed Feb. 12, 1962, Ser. No. 172,512
4 Claims. (Cl. 53—30)

This invention relates to an improved method of packaging and to an improved package produced by said method. The invention more particularly relates to the packaging of objects with shrinkable thermoplastic formable film overwraps and the postforming of the package after the wrapping material is shrunk thereover.

Many articles, particularly those having a relatively small unit size, are packaged for sale in packages containing a number of such articles. For example, eggs are frequently purchased by the dozen. Apples, tomatoes, and the like are often sold in a tray of four. Cabinet hardware such as locks are packaged upon cards which contain the various parts of the assembly separated as individual items on a common base. Many articles are packaged by vacuum forming a sheet over the article supported on a backing board. The plastic sheet is drawn into close conformation with the desired article. Such vacuum forming means are expensive and often, in the case of a peculiarly shaped object, are notably unsuitable, the overwrap sheet or film in a vacuum forming being forced into openings or crevices where it is undesirable. Further, vacuum forming requires the use of relatively large and expensive machinery, including a vacuum pump, molds, clamping frames, and the like.

It is an object of this invention to provide an improved method of packaging wherein a thermoplastic overwrap material is conformed to the desired degree about the object being packaged without utilizing relatively large and expensive equipment.

A further object of this invention is to provide an improved method for the packaging of articles within a shrinkable thermoplastic film.

Still another object of this invention is to prepare an improved package wherein the degree of conformation of the film to the packaged article is readily controlled.

These objects and other advantages and benefits in accordance with the invention are readily achieved by overwrapping at least one shaped article in a thermoplastic shrinkable heat formable membrane, joining said membrane to a supporting means to form an overwrap, subjecting the overwrapped object to a temperature sufficiently high to cause said thermoplastic membrane to shrink and at least partially conform to the shape of its contents, maintaining said overwrap at a heat formable temperature, and mechanically forcing the overwrap to at least partially conform to said contents and cooling said overwrap below its heat formable temperature.

Further features and advantages of the invention will become more apparent when taken in consideration with the following specification and drawing wherein.

Figure 1:
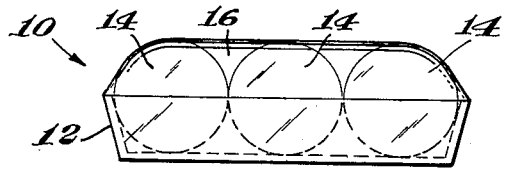
FIGURE 1 depicts a package having shaped articles within a shrinkable film.

In FIGURE 1 there is illustrated a package generally designated by the reference numeral 10, the package 10 comprising a tray 12 containing a plurality of objects 14 to be packaged. The tray 12 and objects 14 are overwrapped with a heat shrinkable, heat formable plastic film 16.

Figure 2:
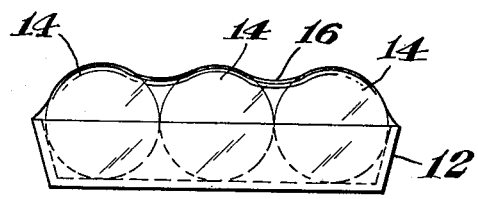
FIGURE 2 depicts a package of FIGURE 1 after heat treatment.

FIGURE 2 depicts a view of the package of FIGURE 1 after being subjected to sufficient heat to cause shrinkage of the overwrap 16.

Figure 3:
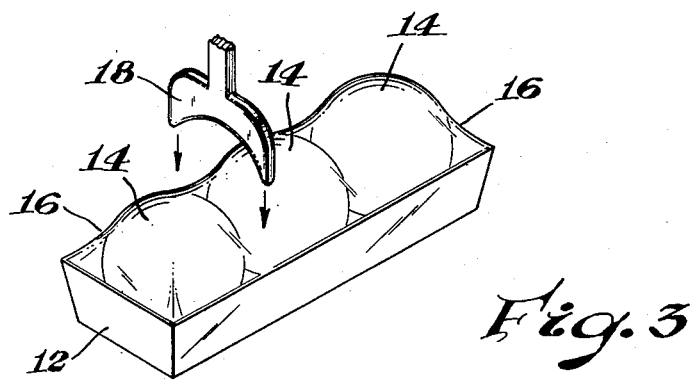
FIGURE 3 depicts the package of FIGURE 2 wherein the plastic material is being partially conformed to the shape of the contents.

FIGURE 3 depicts a view of the package of FIGURE 2 during the postforming operation wherein heat formable thermoplastic overwrap 16 is forced between the objects 14 by means of the shaping tool 18.

Figure 4:
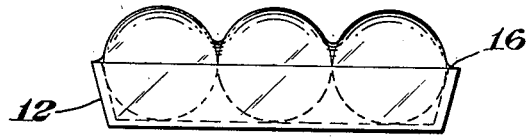
FIGURE 4 depicts the view of a finished package in accordance with the invention.

FIGURE 4 depicts a view of the complete package when the thermoplastic overwrap 16 is conformed closely to its configuration of the objects 14 on the tray 12.

A wide variety of thermoplastic resinous, heat formable, heat shrinkable films may be employed in the practice of the invention including such materials as oriented polystyrene, oriented and shrinkable films of copolymers of vinyl and vinylidene chloride, polyethylene, polypropylene, and the like. In the practice of the invention the article or combination of articles to be packaged is overwrapped with the heat shrinkable thermoformable film, and the edges of the film are secured in a conventional manner, such as by heat sealing, gluing, taping, or the like. Beneficially the overwrap of the package may be complete and the film joined to itself. When the initial overwrap is completed, the package is subjected to sufficient heat to raise the thermoplastic overwrap to a shrinkable temperature and sufficient heat is usually applied to allow the overwrap to reach a minimal surface.

Beneficially, in most operations, it is most convenient to apply a suitable mechanical means to force the now thermoformable overwrap into the desired degree of conformity with the packaged article or combination of articles. When a shrinkable film has reached a temperature sufficient to cause shrinkage it can be readily deformed by the application of gentle mechanical pressure. Thus, in the case of the package depicted in FIGURES 1 through 4, film is brought into contact with the desired portion of the packaged articles by means of a tool such as the paddle or forming tool 18 illustrated in FIGURE 3. Alternately such a device may be a wire loop to engage the film stretched about the packaged article and maintain it in position until a temperature has been reached where the film no longer is plastic, but is rigid and will maintain its shape. A wide variety of materials are suitable for the mechanical forming of the film. Typical of these are such plastic materials as polytetrafluoroethylene, nylon, polyvinyl chloride and the like. Choice of the particular material employed will depend primarily of the nature of the forming, and the particular characteristics of the individual film employed for the overwrap. Usually it is beneficial that the forming tool should have a smooth surface in order to form an attractive package and minimize the possibility of adherence of the film to the tool. Beneficially, if such tools are prepared from metal, in some cases it is desirable to lubricate the surface of the tool which comes in contact with the film when a suitable mold release may include such materials as are well known in the art for the purpose. Attractive patterns are often achieved if the surface of the tool is roughened such as by ribbing or knurling.

In order to further illustrate the invention, 6 apples were placed in a paper tray and were overwrapped with an oriented polystyrene film having a thickness of about 1½ mils. The overwrap was drawn together at the bottom and heat sealed by the application of a hot shoe. The resultant package was subjected to air at a temperature of from about 280° to 310° Fahrenheit for a period of from about 4 to 6 seconds. The polystyrene overwrap shrunk and conformed to the package to give a minimal surface. The shrinkage of the polystyrene film formed saddle surfaces between the adjacent apples, and these were immediately pressed into the surfaces between the apples by means of a plastic paddle which was trimmed to a suitable shape. The resultant package was attractive and a major part of the top hemispherical portions of the apples were in engagement with the packaging film.

In a manner similar to the foregoing illustration, other shaped articles and other oriented heat shrinkable plastic films are employed overwraps to give commensurate results.

As is apparent from the foregoing specification, the article and apparatus of the present invention are susceptible of being embodied with various alterations and modifications which may differ particularly from those that have been described in the preceding specification and description. For this reason, it is to be fully understood that all of the foregoing is intended to be mere illustrative and is not to be construed or interpreted as being restrictive or otherwise limiting of the present invention, excepting as it is set forth and defined in the hereto appended claims.

What is claimed is:

1. A method of forming a package comprising overwrapping at least one shaped article in a thermoplastic shrinkable heat formable membrane, joining said membrane to a supporting means to form an overwrap, subjecting the overwrapped object to a temperature sufficiently high to cause said thermoplastic film to shrink and at least partially conform to the shape of its contents, maintaining said overwrap at a heat formable temperature and mechanically forcing the overwrap at least to partially conform to said contents, the overwrap conforming smoothly to the contents in such a manner that the portion of the overwrap in contact with the contents is increased from the area in contact with the contents when the minimal plastic surface is formed by the initial shrinking of the overwrap and then cooling said overwrap below its heat formable temperature.

2. The method of claim 1, wherein said thermoplastic shrinkable heat formable membrane completely overwraps the contents and is adjoined to itself.

3. The method of claim 2, wherein said thermoplastic membrane is joined to a container.

4. The method of claim 1, wherein said package contains a plurality of generally spherical objects.

References Cited in the file of this patent
UNITED STATES PATENTS

| | | |
|---|---|---|
| 2,711,346 | Irwin et al. | June 21, 1955 |
| 2,945,586 | Mackes | July 19, 1960 |
| 2,952,353 | Rohdin | Sept. 13, 1960 |
| 2,980,245 | Stoker | Apr. 18, 1961 |
| 2,985,296 | Kahn | May 23, 1961 |
| 3,022,614 | Dreyfus et al. | Feb. 27, 1962 |
| 3,034,271 | Carpenter et al. | May 15, 1962 |
| 3,047,140 | Robins | July 31, 1962 |
| 3,053,023 | Watts | Sept. 11, 1962 |
| 3,076,542 | Lowry et al. | Feb. 5, 1963 |